Sept. 2, 1924.       E. C. SHILEY       1,507,211
ROLLER BEARING
Filed Nov. 4, 1921       2 Sheets-Sheet 2

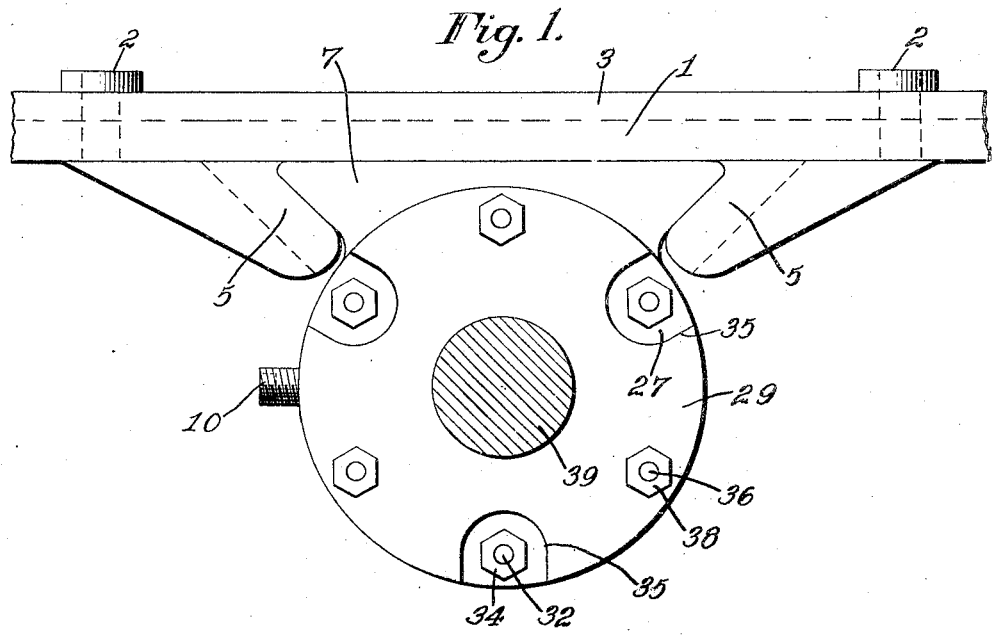
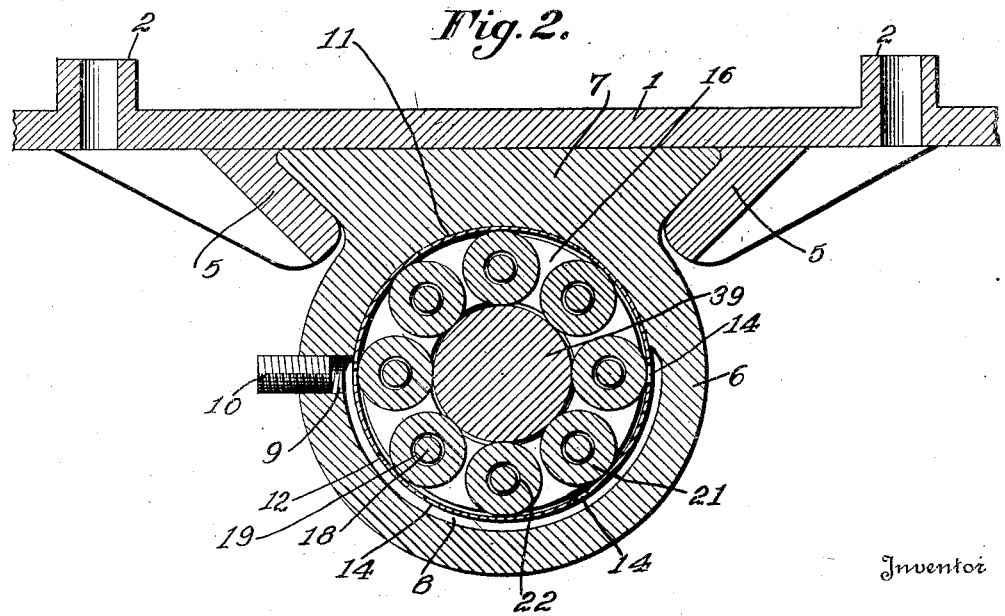

Inventor
E. C. Shiley.
By C. A. Snow & Co.
Attorney

Patented Sept. 2, 1924.

1,507,211

UNITED STATES PATENT OFFICE.

ELMER C. SHILEY, OF FRACKVILLE, PENNSYLVANIA, ASSIGNOR OF ONE-HALF TO JAMES R. WILLIAMS, OF FRACKVILLE, PENNSYLVANIA.

ROLLER BEARING.

Application filed November 4, 1921. Serial No. 512,879.

*To all whom it may concern:*

Be it known that I, ELMER C. SHILEY, a citizen of the United States, residing at Frackville, in the county of Schuylkill and State of Pennsylvania, have invented a new and useful Roller Bearing, of which the following is a specification.

The device forming the subject matter of this application is a roller bearing adapted to be used on mine cars and elsewhere under conditions which require a strong and durable bearing.

The invention aims to provide a bearing of the kind mentioned which can be lubricated readily, novel means being provided for preventing a leakage of the lubricant.

The invention aims, further, to provide novel means for supporting rotatably, the element which the bearing carries, and to provide novel means for holding the working parts in operative relation to each other.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 3:
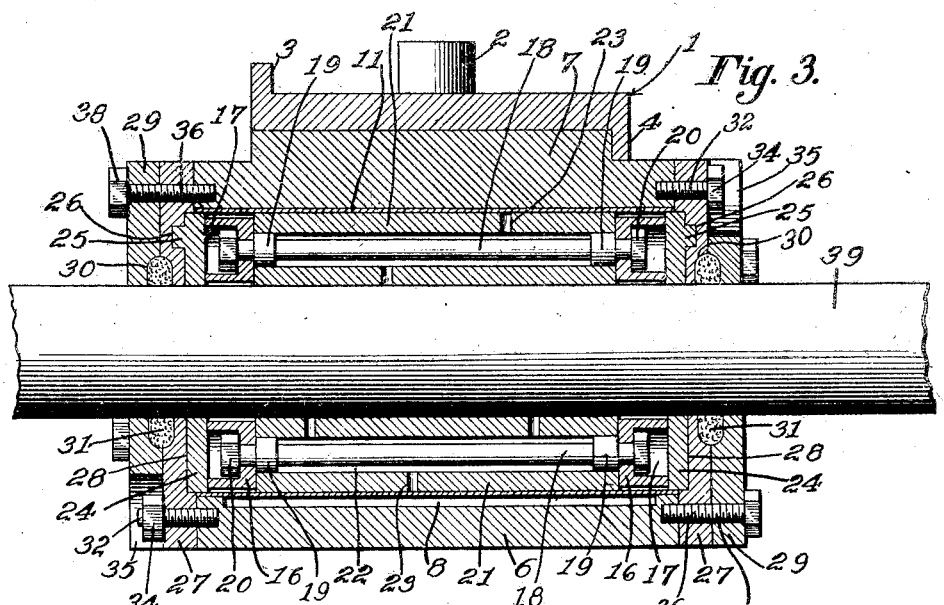
Figure 4:
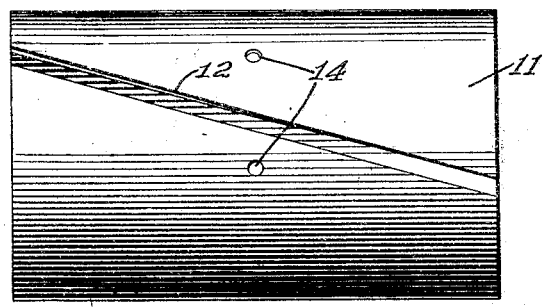
Figure 7:
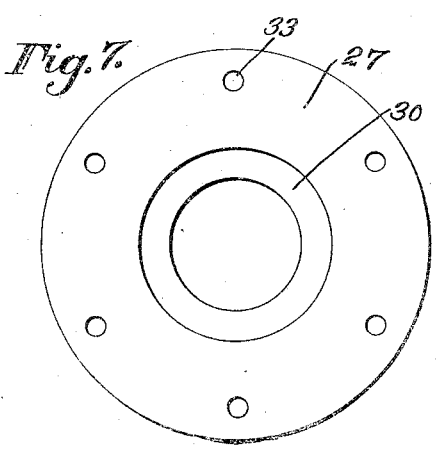
Figure 6:
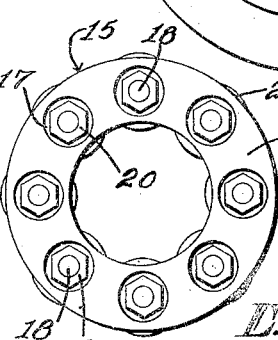

Figure 1 shows in end elevation, a device constructed in accordance with the invention; Figure 2 is a transverse section; Figure 3 is a longitudinal section wherein parts appear in elevation; Figure 4 is an elevation showing the bushing; Figure 5 is an elevation disclosing one of the inner heads; Figure 6 is an end elevation of the carriage which supports the rollers; Figure 7 is an elevation showing the opposite surface of the head from that depicted in Figure 5.

The device forming the subject matter of this application may include a bracket 1 provided with suitable attaching means 2 whereby the bracket may be connected to a support. The bracket is supplied with a retaining flange 3 and with a stop flange 4, the flanges 3 and 4 projecting in opposite directions. The bracket 1 is equipped with converging wings 5.

The numeral 6 marks a cylindrical casing, carrying a base 7, shaped to fit between the wings 5 of the bracket 1, it being possible to slide the base 7 between the wings 5, into abutment with the stop flange 4, to effect a mounting of the casing 6 on the bracket 1.

The casing 6 is provided with an oil chamber 8 spaced from the ends of the casing (Figure 3) and extended part way around the casing 6 (Figure 2) in the interior thereof. The casing 6 has an inlet opening 9 whereby oil may be introduced into the chamber 8, the inlet opening being under the control of a screw plug 10 or other closure.

Disposed within the casing 6 is a cylindrical bushing 11, which may be made of metal, the bushing being split diagonally, from end to end, as shown at 12, and being supplied with any desired number of openings 14 communicating with the oil chamber 8. A cage 15 is located within the bushing 11.

The cage 15 is a composite structure, comprising annular end members 16 having chambers 17 in their outer surfaces. The end members 16 are connected by shafts 18 having enlarged bearings 19 cooperating with the inner surfaces of the end members 16, the bearings 19, therefore, serving as abutment for the end members. Nuts 20 are located in the chambers 16 and are threaded on the ends of the shafts 18, to hold the end members 16 thereon. Rollers 21 are located between the end members 16 of the cage 15 and are journaled on the bearings 19 of the shafts 18, the bore of each roller 21 being of sufficient size so that an oil chamber 22 exists, within each roller 21, about the corresponding shaft 18 and between the bearings or abutments 19. Each roller 21 is provided with ports 23, communicating at their inner ends with the oil receptacles 22, and opening at their outer ends against the bushing 11.

Washers 24, which may be made of antifriction material if desired, extend into the ends of the bushing 11 and engage the end members 16 of the cage 15, the washers being provided with outwardly extended dowel pins 25, received in seats 26 formed in inner heads 27, the heads 27 being provided on their inner surfaces with recesses 28 wherein the washers 24 are seated. Outer heads 29 abut against the inner heads 27, the heads 29 and 27 being supplied with cooperating annular chambers 30 receiving compressible packings 31. Studs 32 project from the ends of the casing 6 and pass through certain openings 33, formed in the heads 27. Nuts 34 are threaded on the studs 32 and engage the heads 27, the outer heads 29 being equipped with notches 35 for the reception of the nuts 34. Studs 36 are mounted in the ends of the casing 6 and pass through certain of the openings 33 in the heads 27, the studs passing through openings 37 in the outer heads 29. Nuts 38 are threaded on the studs 36 and bear against the outer heads 29. It is obvious that any suitable means, such as screws, may be employed in the place of the studs 32 and the studs 36, the change contemplated being a mere mechanical expedient, working no change in the showing of the drawings.

A shaft or axle 39 is provided, the same being supported for rotation on the rollers 21 of the cage 15, the shaft or axle passing outwardly through the washers 24, through the inner heads 27, through the outer heads 29, and through the annular compressible packings 31.

When the closure 10 is removed, oil may be inserted into the chamber 8, through the opening 9, the oil finding its way through the openings 14 of the bushing 11, and from thence, into the oil receptacles 22 of the rollers 21, through the ports 23 the rollers thus being lubricated as they turn upon the bearings 19 of the shafts 18. Owing to the fact that the split 12 in the bushing 11 extends diagonally of the bushing, the rollers 21 will be prevented from catching on the edges defined in the bushing 11 by the slit at 12. When the nuts 38 are tightened up, the packings 31 will be compressed about the shaft 39, to prevent leakage of the lubricant. Owing to the fact that the outer heads 29 are connected to the casing 6 independently of the inner heads 27, the outer heads may be removed, thereby permitting a renewal of the packings 31 at any time, without detaching the inner heads 27 from the casing 6, and without detaching the device, considered as an entity, from the shaft or axle 39. The washers 24 cannot rotate, because the dowel pins 25 thereof are received in the seats 26 of the inner heads 27. The washers 24 prevent the inner heads 27 from being worn by contact with the end members 16 of the cage 15, the washers affording rubbing or bearing surfaces for the end members 16 of the cage 15. Since the nuts 20 are received in the chambers 17, the nuts are out of contact with the washers 24, and the washers will not be worn by contact with the nuts.

What is claimed is:—

In a device of the class described, a cylindrical casing provided with an internal oil chamber extended part way around the casing, inner and outer heads on each end of the casing and provided upon their abutting surfaces with cooperating annular recesses, annular packings in the recesses, washers engaging the inner surfaces of the inner heads and connected thereto by dowels, a split-cylindrical bushing in the casing and engaged at its ends about the washers, the bushing having an opening communicating with the chamber, annular end members within the bushing and abutting against the washers, shafts connecting the end members, rollers journaled on the shafts and located between the end members, the rollers having internal oil reservoirs and being provided with transverse oil ports adapted to receive oil from the chamber, by way of the opening of the bushing, and a rotatable element carried by the rollers and extended through the end members, the washers, the heads and the packings, the packings surrounding the rotatable element closely.

In testimony that I claim the foregoing as my own, I have hereto affixed my signature in the presence of two witnesses.

ELMER C. SHILEY.

Witnesses:
JAMES R. WILLIAMS,
JAMES S. HICKS.